(12) United States Patent
Moore

(10) Patent No.: US 9,909,666 B2
(45) Date of Patent: Mar. 6, 2018

(54) HAMMER HAVING PISTON SLEEVE WITH SPIRAL GROOVES

(71) Applicant: Caterpillar Inc., Peoria, IL (US)

(72) Inventor: Cody Moore, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 609 days.

(21) Appl. No.: 14/556,991

(22) Filed: Dec. 1, 2014

(65) Prior Publication Data

US 2016/0151903 A1 Jun. 2, 2016

(51) Int. Cl.
*F16J 10/04* (2006.01)
*B25D 17/06* (2006.01)
*B25D 9/00* (2006.01)

(52) U.S. Cl.
CPC .............. *F16J 10/04* (2013.01); *B25D 9/00* (2013.01); *B25D 17/06* (2013.01); *B25D 2217/0019* (2013.01); *B25D 2250/231* (2013.01)

(58) Field of Classification Search
CPC ....................................................... F16J 10/04
USPC ................................................. 173/184, 207
See application file for complete search history.

(56) References Cited

U.S. PATENT DOCUMENTS

| | | | | |
|---|---|---|---|---|
| 3,263,770 A * | 8/1966 | Alm ...................... | B25D 17/11 |
| | | | 181/230 |
| 3,948,288 A * | 4/1976 | Mayer ...................... | F15B 1/18 |
| | | | 138/30 |
| 4,005,637 A * | 2/1977 | Bouyoucos ............... | B25D 9/12 |
| | | | 91/276 |
| 4,380,901 A * | 4/1983 | Rautimo ................... | B25D 9/12 |
| | | | 60/418 |
| 4,483,402 A * | 11/1984 | Vonhoff, Jr. ............. | B25D 9/08 |
| | | | 173/112 |
| 4,552,227 A * | 11/1985 | Wohlwend ............. | B25D 9/145 |
| | | | 173/15 |
| 4,909,490 A * | 3/1990 | de Fontenay ......... | F16F 13/262 |
| | | | 138/30 |
| 4,969,632 A * | 11/1990 | Hodgson ............... | F16F 13/262 |
| | | | 267/140.11 |
| 5,277,259 A | 1/1994 | Schmid et al. | |
| 5,370,193 A * | 12/1994 | Sippus ................... | B25D 17/24 |
| | | | 173/162.1 |
| 6,510,904 B1 * | 1/2003 | Tyrrell ................... | B25D 17/08 |
| | | | 173/128 |
| 7,052,004 B2 * | 5/2006 | Siemer .................. | F16F 13/107 |
| | | | 267/140.11 |
| 7,328,753 B2 | 2/2008 | Henriksson et al. | |
| 8,733,468 B2 | 5/2014 | Teipel et al. | |
| 2004/0188146 A1 * | 9/2004 | Egerstrom ............... | E21B 4/14 |
| | | | 175/296 |
| 2005/0167131 A1 * | 8/2005 | Hurskainen ............ | B25D 9/145 |
| | | | 173/206 |

(Continued)

FOREIGN PATENT DOCUMENTS

DE  10 2013 202 248  12/2013
DE  10 2012 211 941  1/2014

*Primary Examiner* — Andrew M Tecco
*Assistant Examiner* — Praachi M Pathak
(74) *Attorney, Agent, or Firm* — Finnegan, Henderson, Farabow, Garrett & Dunner, LLP

(57) ABSTRACT

A sleeve is disclosed for use with a hammer. The sleeve may have a generally cylindrical body with a first end and a second end. The sleeve may also have a plurality of channels spiraling at least partially around the generally cylindrical body between the first and second ends.

19 Claims, 3 Drawing Sheets

(56) References Cited

U.S. PATENT DOCUMENTS

| | | | |
|---|---|---|---|
| 2008/0296035 A1* | 12/2008 | Lohmann | B25D 9/265 173/177 |
| 2012/0138328 A1* | 6/2012 | Teipel | B25D 9/12 173/207 |
| 2012/0267138 A1 | 10/2012 | Fuenfer | |
| 2013/0327212 A1* | 12/2013 | Ficht | F02F 1/004 92/172 |
| 2014/0020920 A1* | 1/2014 | Tang | B25D 9/145 173/90 |
| 2014/0262406 A1* | 9/2014 | Moore | B25D 9/145 173/208 |
| 2014/0262407 A1* | 9/2014 | Moore | B25D 9/145 173/208 |
| 2016/0151903 A1* | 6/2016 | Moore | F16J 10/04 173/207 |
| 2016/0176033 A1* | 6/2016 | Juvonen | B25D 9/26 173/207 |
| 2016/0312892 A1* | 10/2016 | Moore | B25D 9/04 |

* cited by examiner

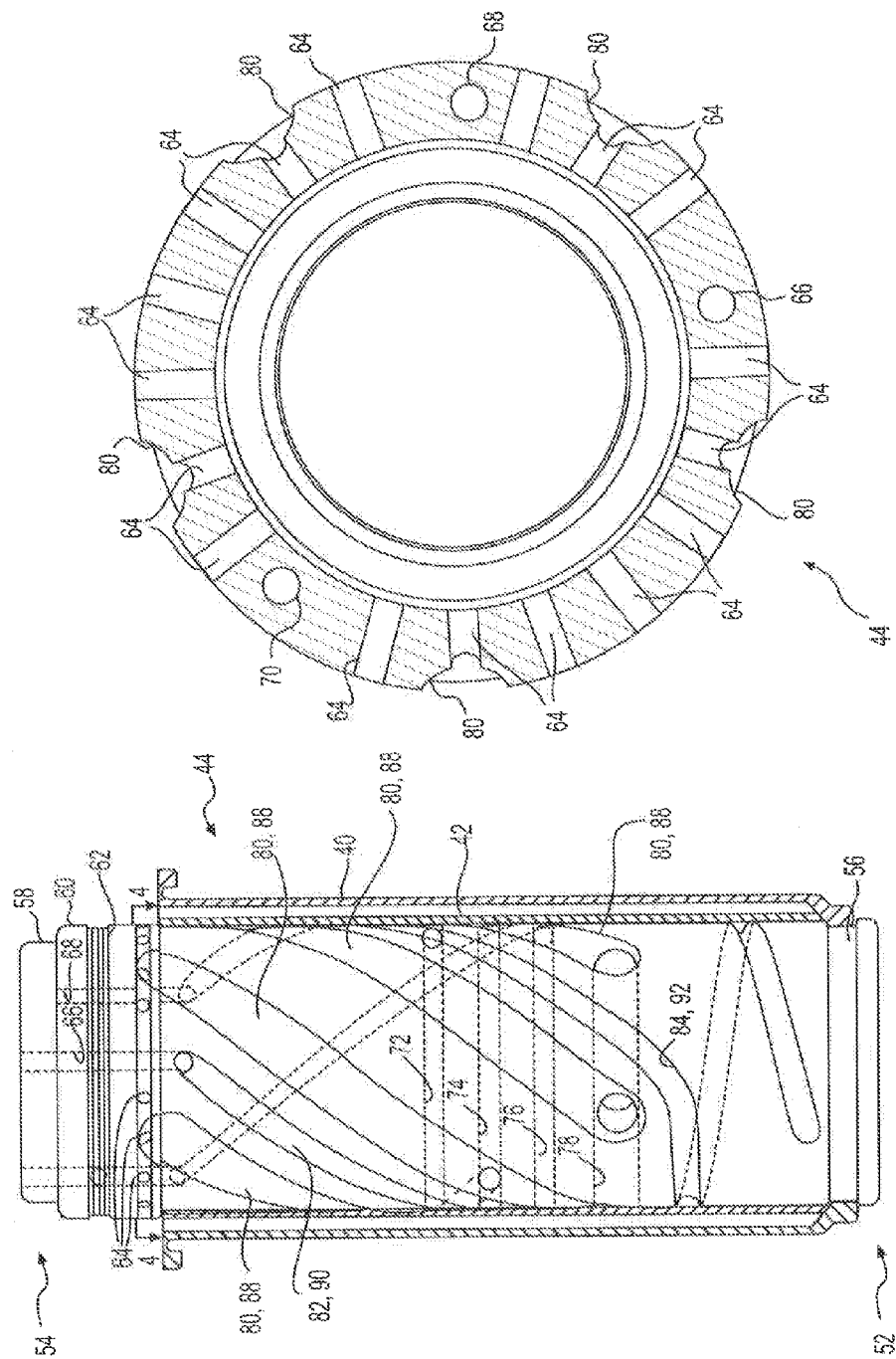

US 9,909,666 B2

HAMMER HAVING PISTON SLEEVE WITH SPIRAL GROOVES

TECHNICAL FIELD

The present disclosure is directed to a hammer and, more particularly, to a hydraulic hammer having a piston sleeve with spiral grooves.

BACKGROUND

A hydraulic hammer, often referred to as a breaker, can be attached to various machines for the purpose of milling asphalt, concrete, stone, and other construction materials. A conventional hammer includes a work tool (e.g., a chisel) having a tip that engages the material to be milled, and a reciprocating piston that is moved by pressurized fluid to repetitively slam against a base end of the work tool. The pressurized fluid used to move the piston is supplied to the piston from a remote accumulator. One or more valves are located within long passages that extend between the accumulator and the piston to control fluid flow from the piston to the accumulator and from the accumulator to the piston.

Although perhaps suitable for some applications, conventional hammers suffer drawbacks. In particular, the passages that communicate the accumulator and piston, because of their lengths, may increase the time it takes for the fluid to travel between the piston and accumulator. This increased fluid travel time can result in a delayed response of the system. For example, a delay may occur between the times the system is activated and the piston is driven forward against the work tool, and likewise between the times the system is deactivated and the piston is withdrawn from the work tool. A delayed hammer response can reduce an overall productivity and efficiency of the machine.

One attempt to improve hammer operation is disclosed in U.S. Patent Publication No. 2014/0262406 of Moore that published on Sep. 18, 2014 ("the '406 publication"). In particular, the '406 publication discloses a hammer having a piston sleeve, in which a piston reciprocates. A sleeve liner is placed over the sleeve, and an accumulator membrane surrounds the sleeve liner. The piston is supplied with and drained of fluid by way of passages formed between the sleeve and the sleeve liner. Specifically, longitudinally extending slots are machined into an outer annular surface of the piston sleeve, and when the sleeve liner is placed over the piston sleeve, the slots become passages for transporting high-pressure fluid to and from the piston. Because the accumulator membrane is located around the sleeve and close to the piston, the fluid passages are short, allowing for enhanced system responsiveness.

The disclosed hammer is directed to overcoming one or more of the problems set forth above and/or other problems of the prior art.

SUMMARY

In one aspect, the present disclosure is directed to a sleeve for a hammer. The sleeve may include a generally cylindrical body with a first end and a second end. The sleeve may also include a plurality of channels spiraling at least partially around the generally cylindrical body between the first and second ends.

In another aspect, the present disclosure is directed to an impact system for a hammer. The impact system may include a piston; and a sleeve having a generally cylindrical body with a first end and a second end, and a plurality of channels spiraling at least partially around the generally cylindrical body between the first and second ends. The sleeve may be configured to internally receive the piston. The impact system may further include a sleeve liner that is shrink-fitted over the sleeve to form a plurality of spiraling passages at the plurality of channels, a seal carrier connected to an end of the sleeve to form a valve enclosure, and a valve disposed within the valve enclosure and movable to selectively direct pressurized fluid through the plurality of spiraling passages to move the piston.

In yet another aspect, the present disclosure is directed to a hydraulic hammer. The hydraulic hammer may include a frame, a bushing disposed within a first end of the frame, a work tool reciprocatingly disposed within the bushing, and a head configured to close off a second end of the frame. The hydraulic hammer may also include an impact system disposed inside the second end of the frame. The impact system may include a piston; and a sleeve having a generally cylindrical body with a first end and a second end, and a plurality of channels spiraling at least partially around the generally cylindrical body between the first and second ends. The sleeve may be configured to internally receive the piston. The impact system may also include a sleeve liner that is shrink-fitted over the sleeve to form a plurality of spiraling passages at the plurality of channels, a seal carrier connected to an end of the sleeve to form a valve enclosure, and a valve disposed within the valve enclosure and movable to selectively direct pressurized fluid through the plurality of spiraling passages. Movement of fluid within the plurality of spiraling passages may move the piston against the work tool. Each of the plurality of spiraling passages may spiral through at least 45°-135°, and each of the plurality of spiraling passages may have a cross-section with a curved bottom.

BRIEF DESCRIPTION OF THE DRAWINGS

FIGS. 3 and 4 are cutaway and cross-sectional view illustrations of an exemplary disclosed hammer sleeve that may form a portion of the hammer assembly of FIG. 2.

DETAILED DESCRIPTION

Figure 1:
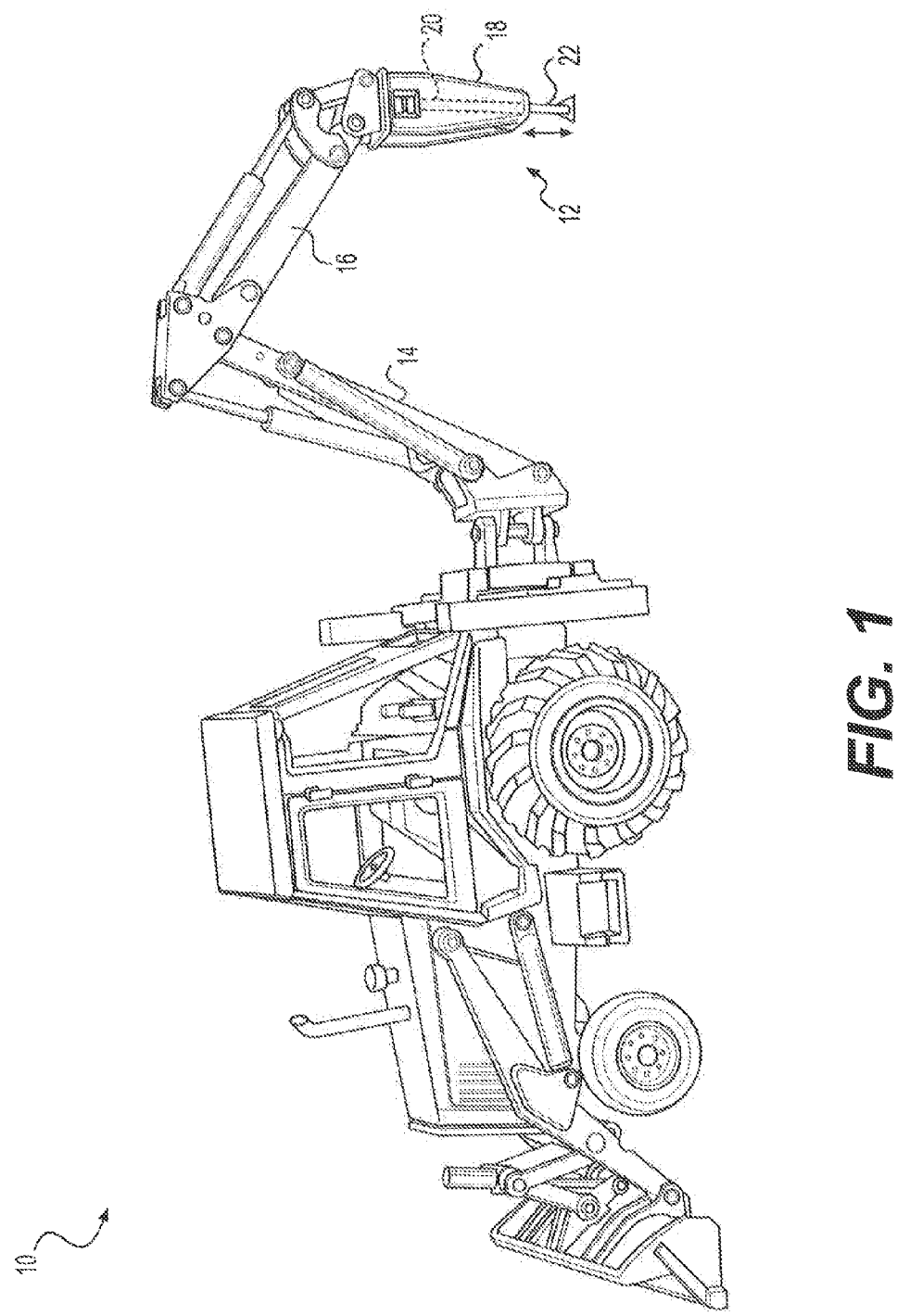
FIG. 1 is an isometric illustration of a machine equipped with an exemplary disclosed hydraulic hammer.

FIG. 1 illustrates a machine 10 having an exemplary disclosed hammer 12 connected thereto. Machine 10 may be configured to perform work associated with a particular industry, such as mining or construction. For example, machine 10 may be a backhoe loader (shown in FIG. 1), an excavator, a skid steer loader, or another machine. Hammer 12 may be pivotally connected to machine 10 through a boom 14 and a stick 16, such that hammer 12 can be lifted, moved in and out, curled, and swung left-to-right. It is contemplated that a different linkage arrangement may alternatively be utilized, if desired, to move hammer 12 in another manner.

Hammer 12 may include an outer shell 18 and an actuator assembly 20 located within outer shell 18. Outer shell 18 may connect actuator assembly 20 to stick 16 and provide protection for actuator assembly 20. A work tool 22 may be operatively connected to an end of actuator assembly 20, opposite stick 16, and protrude from outer shell 18. It is contemplated that work tool 22 may have any configuration known in the art. In the disclosed embodiment, work tool 22 is a chisel bit.

Figure 2:
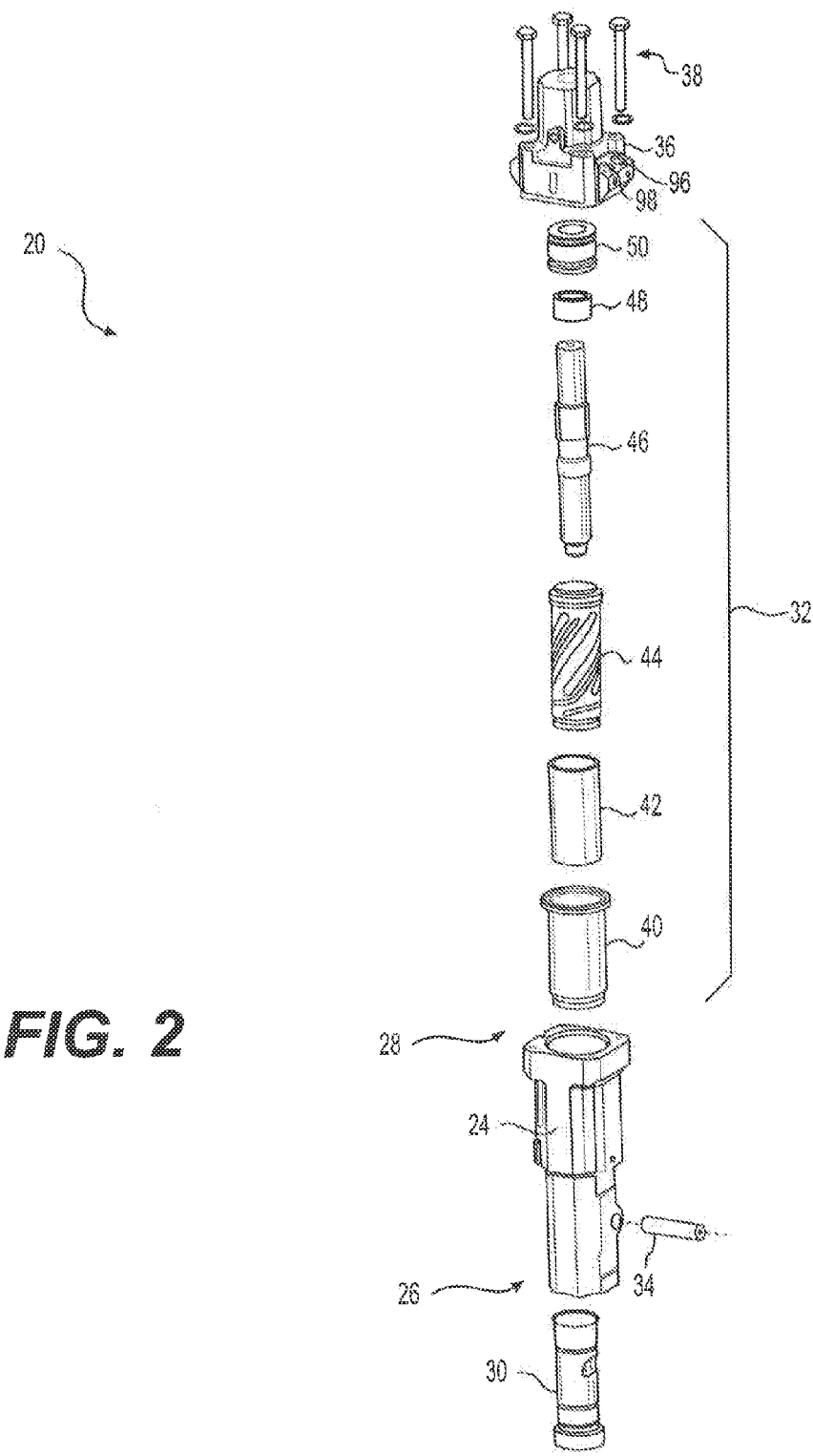
FIG. 2 is an exploded view illustration of an exemplary disclosed hammer assembly that may form a portion of the hydraulic hammer of FIG. 1.

As shown in the exploded illustration of FIG. 2, actuator assembly 20 may include a frame 24 having a bottom end 26 and an opposing top end 28. A bushing 30 may be disposed within bottom end 26, and an impact system 32 may be housed within top end 28. Bushing 30 may be configured to receive work tool 22 (referring to FIG. 1), and a pin 34 may secure work tool 22 and bushing 30 inside frame 24. A head 36 may close off top end 28 of frame 24, thereby enclosing impact system 32, and one or more threaded fasteners 38 may rigidly attach head 36 to frame 24.

Impact system 32 may be an assembly of components co-axially disposed within frame 24 that cooperate to induce vertical reciprocation of work tool 22 within bushing 30. Specifically, impact system 32 may include, among other things, an accumulator membrane 40, a sleeve liner 42, a sleeve 44, a piston 46, a valve 48, and a seal carrier 50. Accumulator membrane 40 may be disposed inside frame 24, sleeve liner 42 may be disposed inside accumulator membrane 40, sleeve 44 may be disposed inside sleeve liner 42, and piston 46 may be disposed inside sleeve 44. Seal carrier 50 may be placed over a base end of piston 46 to form an enclosure, and valve 48 may be configured to axially slide up and down within the enclosure. Valve 48 and seal carrier 50 may be located entirely within head 36, while accumulator membrane 40, sleeve 44, and sleeve liner 42 may be located entirely within frame 24. Piston 46 may be configured to slide within both of frame 24 and head 36 during operation, with an impact end of piston 46 repeatedly contacting an internal end of work tool 22 (referring to FIG. 1).

Accumulator membrane 40 may be a flexible tube configured to hold an amount of pressurized fluid sufficient to drive piston 46 through at least one stroke. The fluid may be held within an annular space formed between an inner wall of accumulator membrane 40 and an outer wall of sleeve liner 42. A pocket may be formed outside of accumulator membrane 40 (i.e., between an outer annular wall of accumulator membrane 40 and an inner annular wall of frame 24) and configured to receive a pressurized gas therein. The pressurized gas may be used as a spring to selectively press accumulator membrane 40 radially inward, thereby contracting the volume of accumulator membrane 40 and further pressurizing the fluid therein.

An exemplary sleeve 44 is shown in FIGS. 3 and 4. As can be seen in these figures, sleeve 44 may be a hollow, relatively rigid tube having a bottom end 52 located near work tool 22 (referring to FIG. 1) and a top end 54 located away from work tool 22. A first annular recess 56 may be formed around sleeve 44 at bottom end 52 and configured to receive an inwardly protruding lip of accumulator membrane 40, thereby creating a fluid seal between sleeve 44 and accumulator membrane 40. Top end 54 of sleeve 44 may be stepped, having a smaller diameter portion 58 protruding from a larger diameter portion 60. Smaller diameter portion 58 may be received within seal carrier 50 (referring to FIG. 2), while larger diameter portion 60 may be received within head 36. A second annular recess 62 may be formed around sleeve 44 at larger diameter portion 60 and configured to receive pressurized fluid for use in automatically shutting off hammer 12 during material breakthrough (explained in more detail below).

Sleeve 44 may have a plurality of radially oriented passages, axially oriented passages, and internal annular grooves formed therein. For example, seventeen different radially oriented passages 64 and three different axially oriented passages 66, 68, and 70 may be formed in top end 54. In addition, four different annular grooves 72, 74, 76, and 78 may be internally formed at a location between bottom and top ends 52, 54. Passages 64 may extend from the outer annular surface of larger diameter portion 60 radially inward to the bore of sleeve 44, and be normally blocked by valve 48 inside of sleeve 44 (referring to FIG. 2). Passages 66, 68, and 70 may extend from an exposed face of sleeve 44 at top end 54, axially downward (relative to the perspective of FIG. 3) to a location immediately adjacent larger diameter portion 60 (i.e., to a side of larger diameter portion 60 closest to bottom end 52). Passages 66, 68, and 70 may be redirected outward at their internal ends through the outer annular surface of sleeve 44 (e.g., via radial drillings). Grooves 72, 74, 76, and 78 may be spaced apart in an transverse direction and arranged in order starting with groove 72 nearest top end 54 and groove 78 located nearest bottom end 52. Grooves 72-76 may have substantially identical geometry, while groove 78 may have a larger width and/or depth.

Sleeve 44 may also have a plurality of longitudinally extending channels formed within its outer annular surface that interconnect passages 64-70 and grooves 72-78. These channels may include, for example four larger channels 80, a first smaller channel 82, a second smaller channel 84, and a third smaller channel 86. Each of channels 80-84 may be redirected inward (e.g., via radial drillings) at their lower ends (i.e., their ends located closest to bottom end 52) to fluidly communicate with the bore of sleeve 44. Each of channels 80 may be have an upper end generally coincident with one of radial passages 64, and function to connect the particular radial passages 64 (and high-pressure inlet fluid) with annular groove 78 at a lower end. Channel 82 may connect axial passage 66 with annular groove 74. Channel 84 may connect axial passage 68 with annular groove 72. Channel 86 may connect axial passage 70 with annular groove 76. Axial passage 70 may also communicate with recess 62.

Channels 80-86 may form portions of corresponding passages. Specifically, during assembly of impact system 32, sleeve liner 42 may be expanded (e.g., through heating), placed over sleeve 44, and then allowed to shrink (e.g., via cooling) back to its original shape. When sleeve liner 42 is shrink-fitted to sleeve 44, sleeve liner 42 may annularly compress the outer surface of sleeve 44. In this configuration, an internal surface of sleeve liner 42, together with channels 80, 82, 84, and 86, may form passages 88, 90, 92, and 94, respectively. Passages 88 may be pressure passages. Passage 90 may be a pilot passage. Passage 92 may be a drain passage. Passage 94 may be a shutoff passage. This method of passage formation may be faster and less expensive that drilling passages into a wall of sleeve 44, and allow for complex passage trajectory. In addition, sleeve 44 may be able to have thinner walls, resulting in a lighter weight component.

Channels 80-86, and corresponding passages 88-94 may spiral around sleeve 44. In particular, each of channels 80-86 may spiral through about 45°-135° (e.g., about 90°) along their length, and a transverse spacing between adjacent channels may remain substantially constant. This spiraling of channels 80-86 may maintain a desired stiffness of sleeve 44 (as opposed to straight channels), resulting in less deformation of sleeve 44 (e.g., of the roundness of the internal bore of sleeve 44) when passages 88-94 are pressurized. In the disclosed embodiment, channel 84 may spiral through more than 90° and also extend further toward bottom end 52 than any of the other channels. For example, channel 84 may spiral concentrically with the other channels along the lengths of the other channels, and then continue to spiral through another 360° (e.g., form a complete circle) at a location below the other channels. This extras spiraling below the other channels may allow channel 84 and passage 92 to function as a leak path for any fluid that escapes from the other passages.

In another embodiment (not shown), channel 84 may continue to spiral concentrically with the other channels along the lengths of the other channels, and then continue to spiral at the same orientation. That is, channel 84, in this embodiment, may only spiral through about 100°. This additional spiraling below the other channels may still allow channel 84 and passage 92 to function as a leak path, but the limited spiraling of about 100° at the same general angle may be simpler to manufacture.

In the disclosed embodiment, channels 80-86 are formed via a milling process. For example, each of channels 80-86 may be cut using a ball end mill, such that a cross-section of each channel is generally circular (i.e., such that a bottom of channels 80, 86 is curved). This curvature may help to reduce formation of stress risers within sleeve 44 that could lead to premature failure under heavy loading. In the disclosed embodiment, channels 80 are formed during a single machining pass using a ball end mill having a diameter of about 30 mm. The depth of the ball end mill used to create channels 80 may be controlled such that a resulting width of channels 80 is about ⅔ of the diameter of the end mill (e.g., about 20 mm). Channels 82-86 may be substantially identical, fabricated for example during a single machining pass with a ball end mill having a diameter of about 12 mm. Channels 82-86 may each have a width of about 10 mm.

The various conduits of impact system 32 may be selectively filled with or drained of pressurized oil to effect movement of piston 46 (referring to FIG. 2). Specifically, an inlet 96 and an outlet 98 (shown only in FIG. 2) may be formed within head 36 and selectively connected with recess 62, passages 64, passages 88-94, and annular grooves 72-78, based on operator command. And depending on the particular connections that are established, piston 46 may move upward, move downward, or be blocked from movement.

For example, based on a command to actuate hammer 12, pressurized fluid may be directed simultaneously through inlet 96 to the internal space of accumulator membrane 40, to recess 62, to radial passages 64, and to passages 80. The space between accumulator membrane 40 and sleeve liner 42 may be filled at this time with pressurized fluid for future use in quickly refilling the other conduits, when needed. The inward flow of fluid through radial passages 64 to the bore of sleeve 44 may be blocked at this time, with valve 48 in its normal down position.

As pressurized fluid flows downward through passages 88 and is redirected radially inward to enter annular groove 78, it may press against a lower shoulder of piston 46 and cause upward movement of piston 46. As piston 46 moves upward, annular grooves 76, 74, and 72 may be sequentially uncovered and fluidly connected to annular groove 78 via the bore of sleeve 44. When annular groove 78 is fluidly connected with annular groove 74, pressurized fluid may flow by way of passage 90 to act on a lower end of control valve 48, causing control valve 48 to move upward and unblock radial passages 64. When this happens, the pressurized fluid at radial passages 64 may flow inward to the bore of sleeve 44 at top end 54 and press against an upper shoulder of piston 46, urging piston 46 back downward. However, because of an imbalance of forces on and/or the upward momentum of piston 46 at this time, the downward force created by the fluid flowing through passages 64 may not yet be large enough to stop or reverse the motion of piston 46.

Further upward movement of piston 46 may eventually fluidly connect annular groove 78 with annular groove 72. When this happens, pressurized fluid may pass from the bore of sleeve 44 at the lower shoulder of piston 46 up through annular groove 72 and passages 92 and 68 to outlet 98, thereby reducing a pressure of the fluid acting on the lower shoulder of piston 46. In this situation, with the pressurized fluid still acting on the upper shoulder of piston 46, the sudden drop in pressure at the lower shoulder of piston 46 may generate a force imbalance that causes downward movement of piston 46.

Piston 46 may move back downward until annular grooves 72, 74, and 76 are sequentially covered up and blocked from communication with annular groove 78 by piston 46. When annular groove 74 is blocked from communicating with annular groove 78, valve 48 may be allowed (and/or forced) back down to its normal position to cut off communication of radial passages 64 with the bore of sleeve 44 and the upper shoulder of piston 46, thereby restarting the cycle.

If, during use of hammer 12, work tool 22 suddenly breaks through the material being milled, work tool 22 may move to a fully extended position. When this happens, pressurized fluid inside annular groove 76 may be communicated with the upper shoulder of piston 46, preventing an upward returning movement of work tool 22. In this situation, hammer 12 may need to be reset before further operation is possible. That is, work tool 22 may need to be mechanically pushed back into bushing 30 far enough such that annular groove 76 is again blocked by piston 46. This can be done by forcing hammer 12 against the ground material via movement of boom 14 and/or stick 16 (referring to FIG. 1).

INDUSTRIAL APPLICABILITY

The disclosed hydraulic hammer may have high efficiency and durability. Specifically, because the disclosed hydraulic hammer may include short fluid paths, fluid may flow quickly within the hammer, which may result in quick movements of the associated work tool. Quick work tool movements may facilitate high productivity of the associated machine and, thereby also improve an efficiency of the milling process. Further, the spiral configuration of passages 88-94 may provide a desired stiffness of sleeve 44 that improves hammer durability.

It will be apparent to those skilled in the art that various modifications and variations can be made to the hammer of the present disclosure. Other embodiments of the hammer will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A hammer sleeve, comprising:
   a generally cylindrical body having a first end and a second end; and
   a plurality of channels spiraling at least partially around the generally cylindrical body between the first and second ends, wherein the plurality of channels include:
   a plurality of first channels each forming a portion of a different pressure passage;

a second channel forming a portion of a drain passage; and a third channel forming a portion of a pilot signal passage.

2. The hammer sleeve of claim 1, wherein the plurality of channels further includes a fourth channel forming a portion of a shutoff passage.

3. The hammer sleeve of claim 2, wherein each of the different pressure passage, signal passage, and shutoff passage spirals through about 90°.

4. The hammer sleeve of claim 3, wherein the drain passage extends from the first end a greater distance toward the second end than each of the different pressure passage, the drain passage, and the signal passage.

5. The hammer sleeve of claim 4, wherein the drain passage spirals through about 100-360° at a location between the second end of the generally cylindrical body and each of the different pressure passage, drain passage, and signal passage.

6. The hammer sleeve of claim 1, wherein the plurality of first channels includes four first channels.

7. The hammer sleeve of claim 1, wherein each of the plurality of first channels has at least one of a depth and a width greater than a depth and a width of the second, third, and fourth channels.

8. The hammer sleeve of claim 7, wherein each of the plurality of first channels, second channel, third channel, and fourth channel has a cross-section with a curved bottom.

9. The hammer sleeve of claim 8, wherein:
each of the plurality of first channels is fabricated using a ball end mill; and
a width of each of the plurality of first channels is about ⅔ of a diameter of the ball end mill.

10. The hammer sleeve of claim 1, wherein:
the generally cylindrical body is hollow;
the hammer sleeve further includes a plurality of radial passages extending inward through the generally cylindrical body at the first end to a bore; and
the different pressure passage associated with each of the plurality of first channels fluidly connects at a first end with a different one of the plurality of radial passages.

11. The hammer sleeve of claim 10, further including:
a first axial passage extending from the first end of the generally cylindrical body to a first end of the drain passage;
a second axial passage extending from the first end of the generally cylindrical body to a first end of the pilot signal passage; and
a third axial passage extending from the first end of the generally cylindrical body to a first end of the shutoff passage.

12. The hammer sleeve of claim 11, further including:
a first annular groove formed inside the generally cylindrical body and fluidly connected to second ends of the different pressure passage associated with each of the plurality of first channels;
a second annular groove formed inside the generally cylindrical body and fluidly connected to a second end of the drain passage;
a third annular groove formed inside the generally cylindrical body and fluidly connected to a second end of the pilot signal passage; and
a fourth annular groove formed inside the generally cylindrical body and fluidly connected to a second end of the shutoff passage.

13. The hammer sleeve of claim 12, wherein:
the first annular groove is located closer to the second end of the generally cylindrical body than the fourth annular groove;
the fourth annular groove is located closer to the second end of the generally cylindrical body than the third annular groove; and
the third annular groove is located closer to the second end of the generally cylindrical body than the second annular groove.

14. The hammer sleeve of claim 1, further including an annular recess formed in an outer surface of the generally cylindrical body at the second end and in fluid communication with the shutoff passage.

15. An impact system, comprising:
a piston;
a sleeve having a generally cylindrical body with a first end and a second end, and a plurality of channels spiraling at least partially around the generally cylindrical body between the first and second ends, the sleeve being configured to internally receive the piston;
a sleeve liner shrink-fitted over the sleeve to form a plurality of spiraling passages at the plurality of channels;
a seal carrier connected to an end of the sleeve to form a valve enclosure; and
a valve disposed within the valve enclosure and movable to selectively direct pressurized fluid through the plurality of spiraling passages to move the piston.

16. The impact system of claim 15, wherein:
the plurality of spiraling passages include:
a plurality of pressure passages;
a drain passage;
a pilot signal passage; and
a shutoff passage; and
each of the plurality of pressure passages, the drain passage, the signal passage, and the shutoff passage spirals through about 45-135°.

17. The impact system of claim 16, wherein:
the drain passage extends from the first end a greater distance toward the second end than the plurality of pressure passages, the signal passage, and the shutoff passage; and
the drain passage spirals through about 360° at a location between the second end of the generally cylindrical body and each of the plurality of pressure passages, the signal passage, and the shutoff passage.

18. The impact system of claim 16, wherein each of the plurality of spiraling passages has a cross-section with a curved bottom.

19. A hydraulic hammer, comprising:
a frame;
a bushing disposed within a first end of the frame;
a work tool reciprocatingly disposed within the bushing;
a head configured to close off a second end of the frame; and
an impact system disposed inside the second end of the frame, the impact system including:
a piston;
a sleeve having a generally cylindrical body with a first end and a second end, and a plurality of channels spiraling at least partially around the generally cylindrical body between the first and second ends, the sleeve being configured to internally receive the piston;

a sleeve liner shrink-fitted over the sleeve to form a plurality of spiraling passages at the plurality of channels;

a seal carrier connected to an end of the sleeve to form a valve enclosure; and a valve disposed within the valve enclosure and movable to selectively direct pressurized fluid through the plurality of spiraling passaged, wherein:

movement of fluid within the plurality of spiraling passages moves the piston against the work tool;

each of the plurality of spiraling passages spirals through about 45-135°; and each of the plurality of spiraling passages has a cross-section with a curved bottom.

\* \* \* \* \*